POLYMERISATION PROCESS

Filed Jan. 25, 1971 6 Sheets-Sheet 1

ALAN CHARLES STURT
ALAN ARTHUR JOHN FEAST
INVENTORS
BY Jacobs & Jacobs
ATTORNEY

ALAN CHARLES STURT
ALAN ARTHUR JOHN FEAST
INVENTORS
BY Jacobs & Jacobs
ATTORNEY

POLYMERISATION PROCESS

Filed Jan. 25, 1971 6 Sheets-Sheet 3

INVENTORS

BY

ATTORNEY

Alan Charles Sturt
Alan Arthur John Feast
INVENTORS
BY Jacobs & Jacobs
ATTORNEY

INVENTORS

BY

ATTORNEY

ALAN CHARLES STURT
ALEXANDER JOHN FROST
INVENTORS

BY Jacobs & Jacobs
ATTORNEY

United States Patent Office 3,740,368

Patented June 19, 1973

3,740,368

POLYMERISATION PROCESS

Alan Charles Sturt, Guildford, and Alan Arthur John Feast, Eastleigh, England, assignors to BP Chemicals Limited, London, England Filed Jan. 25, 1971, Ser. No. 109,475
Int. Cl. C08d *1/09, 3/02, 3/06*
U.S. Cl. 260—29.7 R 8 Claims

ABSTRACT OF THE DISCLOSURE

Large particle size latices are prepared by emulsion polymerisation using a carboxylic acid salt emulsifying agent, the pH of the system being increased to increase the amount of emulsifying agent in the system during the course of the polymerisation without the addition of new emulsifying agent. In particular, large particle size polybutadiene latices can be prepared by maintaining the pH such that the carboxylic acid is 7.5 to 70.5% neutralised for the initial portion of the reaction.

Figure 1:
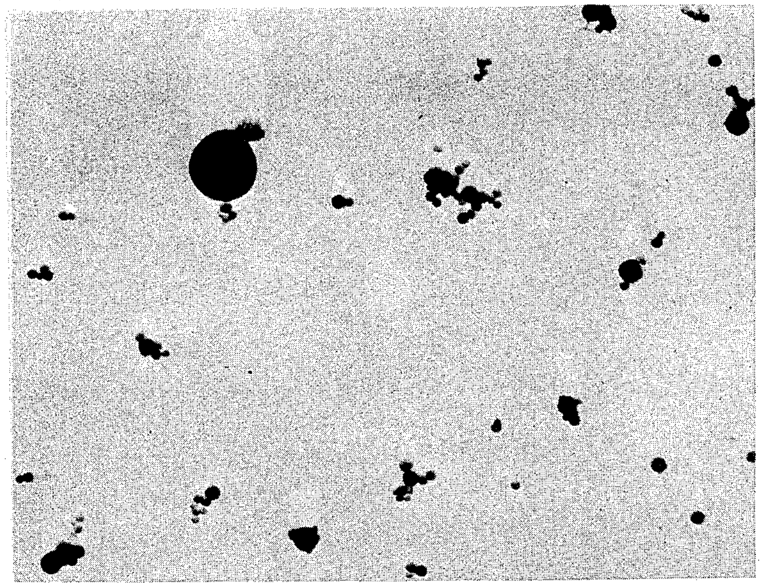

The present invention relates to a process for the preparation of polymeric latices.

Processes for the preparation of homo-polymer and copolymer latices are well known. Such processes are carried out by emulsifying the monomer or monomers in water using an emulsifying agent, and initiating the polymerisation with a water soluble initiator system. In such processes all or part of the various components of the system can suitably be present at the start of the polymerisation or fed incrementally or continuously to the system throughout the course of the polymerisation.

Latices having larger average particle sizes than latices made by the above mentioned conventional processes are required for some purposes. For example such latices combine low viscosity with high solids content. Further, it has been found that in the preparation of ABS (acrylonitrile/polybutadiene/styrene copolymers) improved impact strengths are obtained when large particle size polybutadiene latices are used.

It is an object of the present invention to provide a process for the production of latices having relatively large average particle sizes especially particles of weight average radius greater than $0.1\mu$, using an emulsion polymerisation technique.

Accordingly the present invention is a process for the preparation of a polymeric latex which comprises (1) emulsifying the monomeric material and an aqueous phase in the presence of an emulsification system consisting essentially of an alkali metal salt or an ammonium salt of a soap-forming carboxylic acid, the pH of the aqueous phase being such that said carboxylic acid is sufficiently neutralised within the range from 7.5 to 70.0% of complete neutralisation, as herein defined, to give a stable emulsion, (2) maintaining the degree of neutralisation of the carboxylic acid within the range 7.5 to 70.0% of complete neutralisation and maintaining a stable emulsion by control of the pH of the aqueous phase for an initial period of until at least 15% by weight of the monomeric material is polymerised and (3) completing the polymerisation of the monomeric material under stable emulsion polymerisation conditions.

Suitable soap-forming carboxylic acids for use in the process of the present invention are disproportionated rosin acids, oleic acid, myristic acid, lauric acid, stearic acid and palmitic acid. When these carboxylic acids from which the emulsifying agents are derived are titrated with aqueous alkali or when aqueous carboxylic acid salt solutions are titrated with acid, two points of inflection are found in the curve obtained by plotting the pH value of the aqueous solution against the quantity of reagent added.

The distance between the two points corresponds to the amount of that particular alkali or acid needed for full neutralisation or acidification of the carboxylic acid or salt respectively. In the process of the present invention the term $x\%$ neutralisation of the carboxylic acid is used to denote the percentage of the distance between the two points of inflection taking the free carboxylic acid inflection point as 0% neutralised.

It is believed that in conventional emulsion polymerisation, the bulk of the product is in the form of small particles because during the early stages of the polymerisation there is present in the system, or, in some procedures, added to the system a sufficient quantity of emulsifying agent to form a very large number of particles. Because of their large number, very few of the particles can grow as large as the majority of particles formed in the process of the present invention. It is further believed that the use of the carboxylic acid in a partially neutralised state as the emulsifying agent at the initial part of the polymerisation limits the micelle formation and therefore the number of growing polymer particles initially formed. This number can optionally be adjusted by the addition of small amounts of known emulsifying agents. As the particles grow during the course of the polymerisation, the emulsion tends to become less stable, and therefore a further addition of emulsifying agent is desirable. By adding alkali and increasing the degree of neutralisation of the carboxylic acid already present in the emulsion, thus forming emulsifying agent in situ, the growing particles are established without the addition of an emulsifying agent per se, which addition would cause further micelle formation and the resultant production of new growing particles.

Preferably the alkali limit or ammonium salt of the soap-forming carboxylic acid is present in an amount of less than three parts by weight, calculated as free acid, per hundred parts by weight of the monomeric material.

The process is operated with the carboxylic acid 7.5 70.5% neutralised, and preferably 15 to 45% neutralised for at least an initial period, suitably until 15 to 25 wt. percent conversion of the monomeric material to polymeric material; although operation at these percent neutralisations for a period up to, for example 60% conversion does not deleteriously affect the particle size distribution of the resultant latex provided the stability of the emulsion system can be maintained.

The process of the present invention can be used for the polymerisation of any of the monomeric materials which are conventionally polymerised in aqueous emulsion to give latex products. Particularly suitable are chloroprene, butadiene, butadiene/acrylonitrile monomer mixtures (from which nitrile rubbers can be prepared) and butadiene/styrene monomer mixtures.

Conventional components of emulsion polymerisation systems can be present in the polymerisation process of the present invention, e.g. polymerisation initiator systems, molecular weight modifiers and the like. These are chosen according to the conventional criteria for the emulsion polymerisation of the monomeric material employed.

The quantity of soap-forming carboxylic acid present at the start of the polymerisation is preferably below 3 parts by weight, per 100 parts by weight of monomeric material, in order that the number of growing polymer particles formed initially is limited. In a preferred aspect of the present invention the quantity of soap-forming carboxylic acid present at the start is less than 1 part by weight per 100 parts by weight of monomeric material.

In a further aspect of the present invention, the emulsification system used can be a two component system, comprising as major component a pH dependent carboxylic acid salt as already described, and as minor component an emulsifying agent which is not dependent on the pH value of the system. It is important that the quantity of the latter present shall not be so great as to form a stable emulsion and allow conventional emulsion polymerisation to take place. The non pH dependent emulsifying agent can suitably be added at the start of the polymerisation to assist in the formation of an initially stable emulsion.

The process of the present invention can also be used to form latices having bimodal particle size distributions, by maintaining the pH of the aqueous phase at a value such that the carboxylic acid emulsifying agent is 7 to 70% neutralised in a first stage of polymerisation, and subsequently adding a further quantity of the same or a different emulsifying agent and/or raising the pH of the aqueous phase in order to cause the formation of new particles without retarding the growth of the particles already formed.

The polymerisation process of the present invention can be carried out at the conventional temperatures for emulsion polymerisation, for example at 5 to 95° C. However, in order to increase the rate of polymerisation without deleteriously affecting the particle size distribution of the resultant latex it is sometimes desirable to commence the polymerisation at a lower temperature, and then, after not more than 25% conversion, to gradually increase the temperature by at least 10° C. For instance in the emulsion polymerisation of butadiene, polymerisation can be commenced at a temperature in the range 40 to 75° C., and is sometimes desirable to raise the temperature as described above to increase polymerisation rate.

Polymer latices having an average particle size in the range 0.1 to 0.6μ can be prepared by the process of the present invention. Where the present invention is used to prepare bimodal particle size latices they can also contain particles of average size of the order 0.05μ.

The process has the further advantage that there is little or no coagulum formation compared with other techniques for producing large particles.

The present invention is further illustrated by the following examples which show the preparation of latices both inside and for comparison, outside the pH range envisaged for the preparation of large particle size latices.

EXAMPLE 1

A bimodal particle size latex of polybutadiene was prepared by the following procedure. At intervals, samples were withdrawn and electron micrographs, all at a magnification of 30,000×, prepared of the latex.

The following materials were charged to a stainless steel reactor: potassium salt of disproportionated rosin acid (emulsifying agent) 1.00 part by weight, lauryl mercaptan 0.25 part by weight, potassium persulphate 0.30 part by weight, Detarex F (50% solution of tetrasodium salt of EDTA and sodium salt of N.N-di(2-hydroxyethyl glycine) 0.03 part by weight and softened water 52.10 parts by weight. The acid and alkaline neutralisation points of the emulsifying agent were respectively at pH values 6.0 and 11.0 when titrated with 10% v./v. acetic acid.

Figure 2:
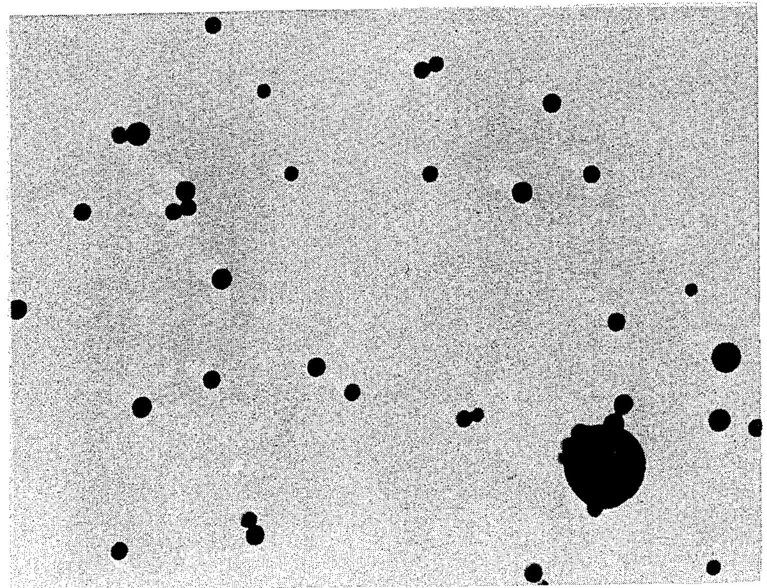
Figure 3:
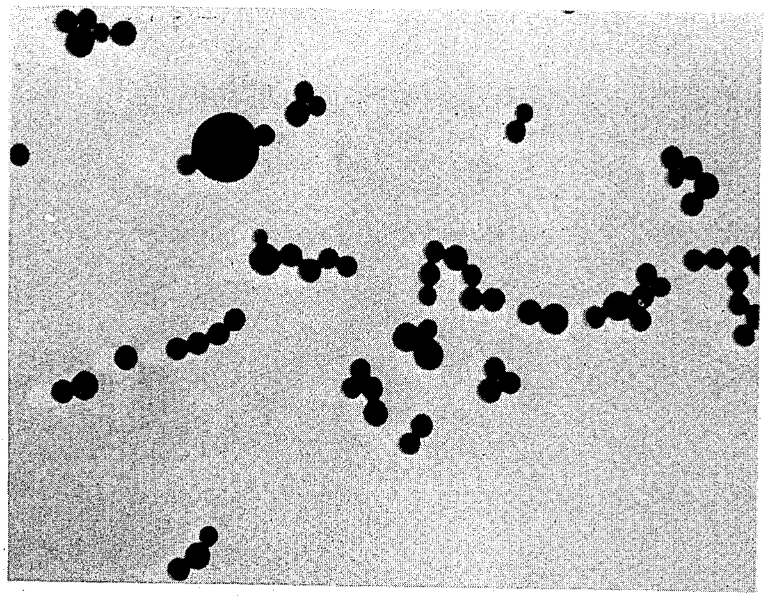
Figure 4:
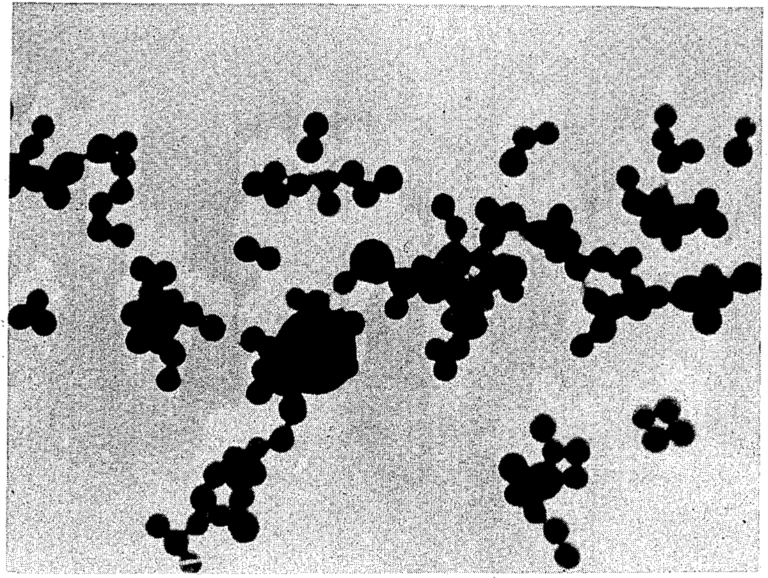
Figure 5:
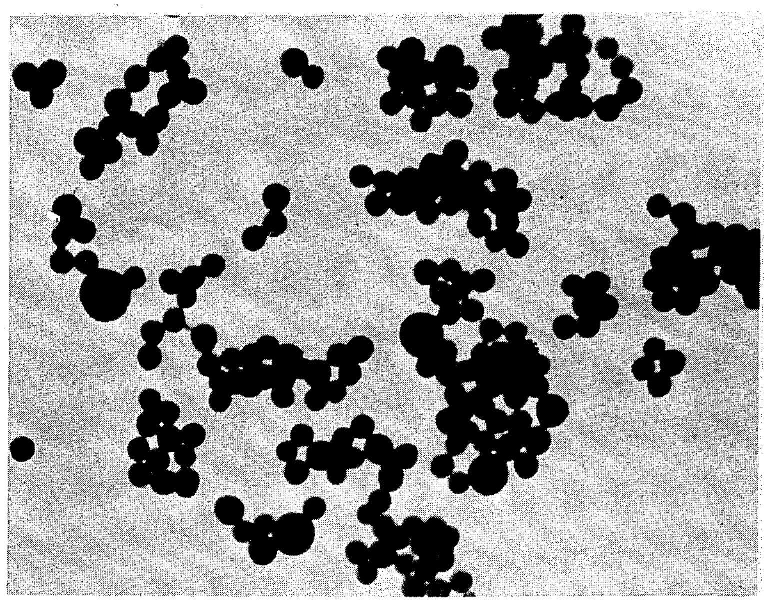
Figure 6:
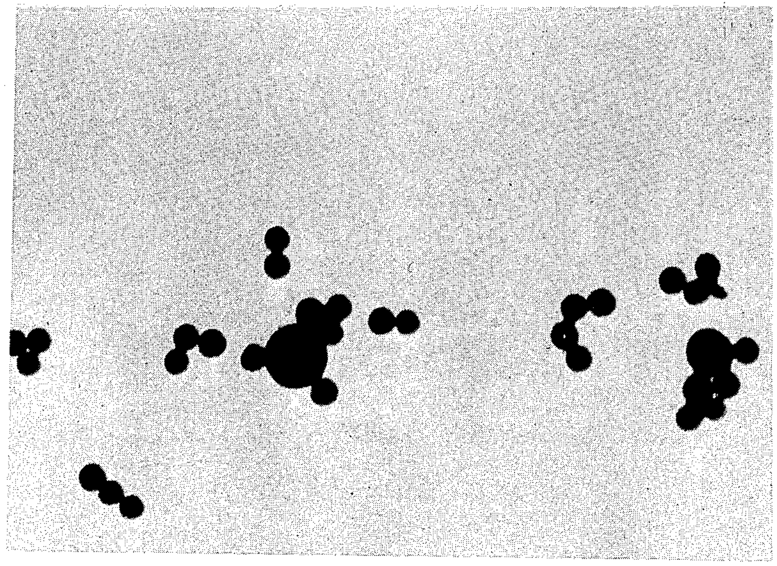

The pH was adjusted to 8.0–8.5 with 10% v./v. acetic acid so that the rosin acid was between 15 and 45% neutralised and the reactor was sealed. The reactor was evacuated and purged with nitrogen twice. After the third evacuation, butadiened, 100 parts by weight was sucked into the reactor. The reactor was then heated to 44° C. After 12 hours at 44° C. the temperature was raised by 1° C. every 2 hours to 66° C. and then held at this level. The pH of the charge was held at 8.0 to 8.5 up to 18.0% conversion. The latex was examined 3 times by electron microscopy during this period, at approximately 1, 7 and 15% conversion giving FIGS. 1, 2 and 3 respectively. At this conversion the particles were largely in the 0.15 to 0.20μ range with some up to 0.4μ. At 18.0% conversion the pH was raised to 9.0 (rosin acid about 64% neutralised) FIG. 4 maintained at this level up to 23.6% conversion FIG. 5. At this conversion the particle size was mainly 0.2μ with some up to 0.4μ. At 23.6% conversion the pH was raised again to 10.0 (rosin and acid about 95% neutralised) FIG. 6 and kept at this level for the rest of the polymerisation. At 40.9% conversion the particle size was 0.2–0.25μ with some up to 0.4μ.

Figure 7:
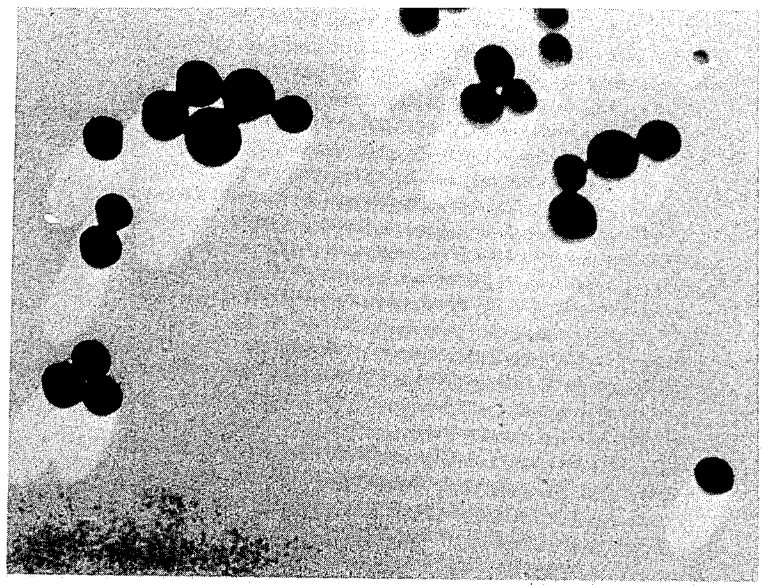
Figure 8:
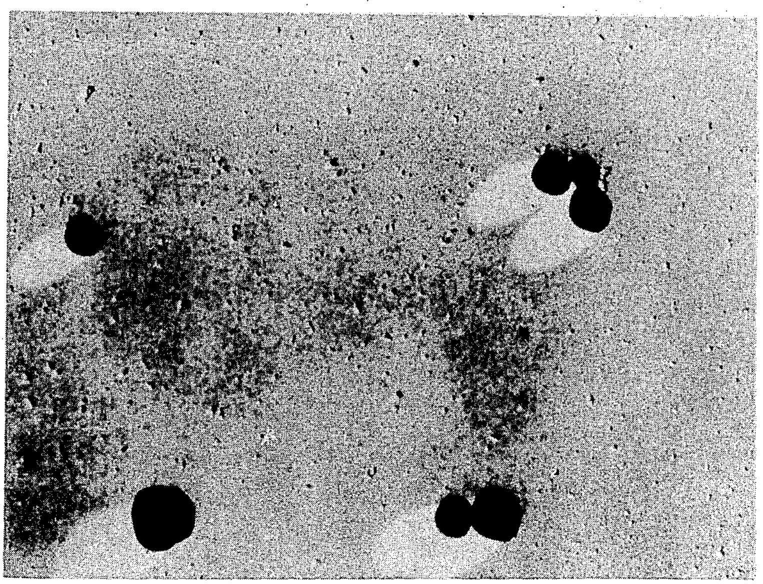

After 30 hours dimethylamine 0.03 part by weight and soft water 0.28 part by weight were added FIG. 7, and at 38% total solids content potassium salt of disproportionated rosin acid 1.25 parts by weight and soft water 5.60 parts by weight were added. At the end of this second addition soft water 21.90 parts by weight were charged. Both additions caused the formation of new particles but did not appear to retard the growth of these already formed FIG. 8. The reaction was stopped at 73.0% conversion FIG. 9 and the reactants cooled to 30° C. After blowdown, potassium salt of disproportionated rosin acid 1.00 part by weight and soft water 4.00 parts by weight were charged. By far the larger proportion of the particles by weight were in the range 0.25 to 0.6μ. A small amount by weight was around 0.05μ resulting from the additional soap and catalyst.

From the micrographs it can be seen that there is a steady growth in particle size from FIG. 1 to FIG. 9. After the additions of alkali FIGS. 4 and 6, which neutralised rosin acid so that it can act as an emulsifying agent, there was substantially no new particle formation. The addition of the potassium salt of disproportionated rosin acid FIG. 8, caused the formation of large numbers of small particles which can be seen to have grown by the time the polymerisation was terminated, FIG. 9.

EXAMPLE 2

By way of comparison the polymerisation was repeated using the same conditions, except that the pH of the system was maintained at 11.0 to 11.5 throughout, so that the rosin acid was fully neutralised. At 65% conversion the particle size was mainly in the range 0.05 to 0.10μ with some particles up to 0.16μ. The reaction was carried through to 97.5% conversion when the particle size averaged about 0.1μ with some particles up to 0.16μ formed.

Figures 9, 10:
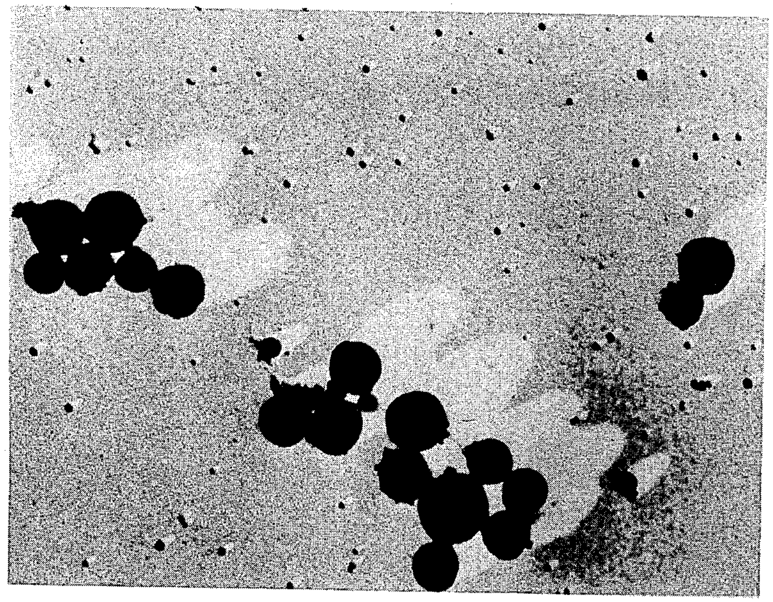
Figure 11:
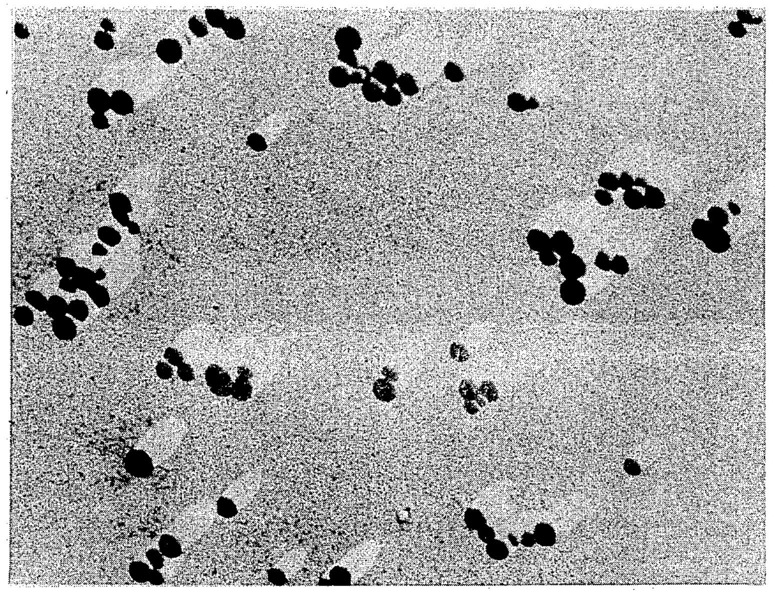

Electron micrographs FIGS. 10 and 11 at 30,000× magnification were taken at 8 hours and at the end of the polymerisation. From these it can be seen that the process proceeds as a conventional emulsion polymerisation resulting in the formation of relatively small particles. At no stage in the reaction were particles larger than 0.16μ formed.

We claim:

1. In the process for the preparation of a polymeric latex through aqueous emulsion polymerization of monomer material selected from the group consisting of chloroprene, butadiene, butadiene-acrylonitrile and butadiene-styrene, the improvement yielding latices of an average particle size of at least 0.1μ which comprises emulsifying the monomer material in water in the presence of less than 3%, by weight of monomer material, of a soap forming carboxylic acid at a pH such that said acid is from 7.5 to 70.0% neutralized as an alkali metal or ammonium salt, maintaining this degree of neutralization by pH control until at least 15% by weight of said monomeric material is polymerized and completing the polymerization under stable emulsion polymerization conditions.

2. A process according to claim 1 wherein the acid is neutralized from 15 to 45%.

3. A process according to claim 1 including the step after at least 15% by weight of said monomeric material is polymerized of either (a) increasing the pH of the emulsion so as to increase the degree of neutralization of said acid or (b) adding additional emulsifying agent to said emulsion whereby said latices have a bimodal particle size distribution.

4. A process as claimed in claim 1 wherein the degree of neutralization is maintained until at least from 15 to 25 wt. percent of the monomeric material is polymerized.

5. A process as claimed in claim 1 wherein the quantity of soap-forming carboxylic acid initially present is less than 1% by weight of monomeric material.

6. A process as claimed in claim 1 including the step of increasing the pH of the aqueous emulsion after at least 15% of said monomeric material is polymerized so as to increase the degree of neutralization of the carboxylic acid and stabilize the growing polymeric particles without promoting the formation of new particles.

7. A process as claimed in claim 1 wherein the aqueous emulsion also initially contains a non-pH dependant emulsification agent in a quantity insufficient to form a stable emulsion in the absence of said alkali metal or ammonium salt of a soap-forming carboxylic acid.

8. A process as claimed in claim 1 wherein the polymerization temperature is increased by at least 10° C. after not more than 25 wt. percent conversion of monomeric material to polymeric material has occurred.

References Cited

UNITED STATES PATENTS

| | | | |
|---|---|---|---|
| 2,589,919 | 3/1952 | Arundale et al. | 260—82.7 |
| 2,676,951 | 4/1954 | McCracken | 260—82.3 |
| 2,720,510 | 10/1955 | Rothlisberger et al. | 260—83.5 |
| 2,664,415 | 12/1953 | Sweely | 260—83.7 |
| 3,012,975 | 12/1961 | Lambert | 260—82.3 X |
| 3,015,642 | 1/1962 | Bawn et al. | 260—29.7 R |

JOSEPH L. SCHOFER, Primary Examiner

W. F. HAMROCK, Assistant Examiner

U.S. Cl. X.R.

260—82.3, 82.7, 83.7, 84.3, 92.3, 94.2 R, 94.4